United States Patent [19]

Kischel et al.

[11] Patent Number: 4,762,531
[45] Date of Patent: Aug. 9, 1988

[54] METHOD FOR REGULATING THE PRESSURE OF A GAS PRODUCED IN A REACTOR

[75] Inventors: Reinhard Kischel, Unterneukirchen; Josef Salzinger, Tüssling; Richard Schöttner, Garching, all of Fed. Rep. of Germany

[73] Assignee: SKW Trostberg Aktiengesellschaft, Trostberg, Fed. Rep. of Germany

[21] Appl. No.: 13,612

[22] Filed: Feb. 12, 1987

[30] Foreign Application Priority Data

Feb. 19, 1986 [DE] Fed. Rep. of Germany ....... 3605172

[51] Int. Cl.⁴ .............................................. F17D 1/04
[52] U.S. Cl. ......................................... 48/191; 137/12; 137/563; 423/659
[58] Field of Search ................... 48/173, 191; 137/12, 137/563; 422/110, 112; 423/659, 441, 442

[56] References Cited

U.S. PATENT DOCUMENTS

| 1,451,011 | 4/1923 | Dreffein | 48/191 |
| 1,522,632 | 1/1925 | Kelly | 48/173 |
| 3,178,267 | 4/1965 | Larson . | |

FOREIGN PATENT DOCUMENTS 1442821 12/1968 Fed. Rep. of Germany .
1013888 12/1965 United Kingdom .

Primary Examiner—Peter Kratz
Attorney, Agent, or Firm—Felfe & Lynch

[57] ABSTRACT

Disclosed is a method for regulating the pressure of a gas produced in a reactor and withdrawn from the reactor continuously by means of a gas compressor lying in a gas withdrawal path, to a substantially constant pressure value in the reactor, in which a first setting member influencing the gas withdrawal rate through the gas withdrawal path is controlled in dependence upon the pressure of the gas in the reactor by way of a first regulating section, characterized in that in dependence upon the pressure of the gas in the reactor moreover by way of a second regulating section a second setting member which influences the gas return rate in a gas return path connecting the gas withdrawal path downstream of the gas compressor with the gas withdrawal path upstream of the gas compressor or with the reactor is controlled, the controlling of the second setting member taking place with less inertia than the controlling of the first setting member.

9 Claims, 1 Drawing Sheet

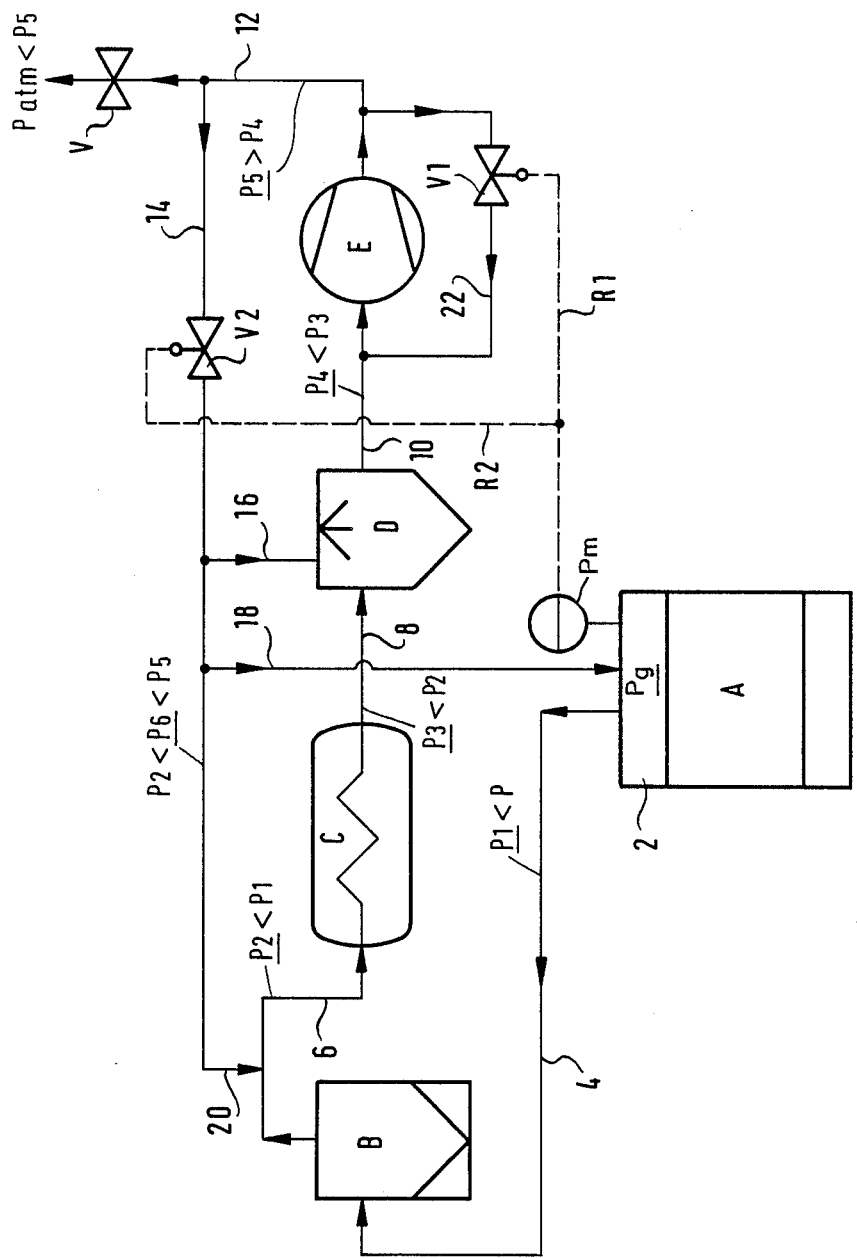

METHOD FOR REGULATING THE PRESSURE OF A GAS PRODUCED IN A REACTOR

BACKGROUND OF THE INVENTION

The present invention is in a method for regulating the pressure of a gas produced in a reactor and continuously withdrawn from the reactor by a gas compressor which is in a gas withdrawal path.

Closed reactors, such for example as industrial furnaces of large volume for the production of calcium carbide, or large mixing appliances in which chemical reactions with gas generation proceed, are dependent in their operation upon numerous influencing values (Winnacker-Küchler, 4th edition, vol. 2, pp. 611 et seq., 1982). Therefore they are frequently subjected to major pressure fluctuations which are caused by irregular gas generation and also spontaneous gas eruptions from the reaction zone of the charge. Large pressure fluctuations cause disturbances in the reactor operation, and also undesirably influences the gas withdrawal.

According to the prior art the gas withdrawal takes place out of closed reactors through a gas compressor which follows a gas preparation plant. The gas delivery is kept largely constant by a regulating circuit inertly responding to the reactor pressure with a by-pass valve as an adjusting member connecting the suction side with the delivery side of the gas compressor By way of example, a slowly occurring pressure rise in a reactor is evened out by closure of the by-pass valve and thus increase of the delivery of the gas compressor.

Rapid pressure variations appearing due to peaks of positive or negative pressure cannot be compensated by the inertly responding regulating circuit. Therefore dangerous gas can escape into the environment from such reactors, since a sudden pressure increased therein, caused by a spontaneous emergence of relatively large gas quantities from the reaction zone, can be brought down only slowly.

On account of the inertia of the regulating section, a rapid pressure rise in the reactor still effects a slowly rising delivery of the gas even when the pressure in the reactor again reaches its ideal value. Over-controlling occurs resulting in the development of a negative pressure in the reactor chamber. Thus undesired external air is sucked into the reactor chamber.

Such problems can endanger the personnel and lead to considerable losses of yield and energy. Furthermore the function of the gas preparation plant connected to the reactor is persistently influenced in an undesired manner by suddenly occurring fluctuations of pressure and quantity of the gas.

SUMMARY OF THE INVENTION

It is therefore the an object of the invention to provide a method which minimizes or leads to only slight variations of the reactor gas pressure gas even in the case of major and rapid fluctuations of the quantity of the gas produced in the reactor, so that such fluctuations exert practically no influence of any kind upon the operation of the plant by means of which the method is carried out, endangering of the personnel by outflowing gas is excluded and the inflow of external air into the reactor chamber is avoided.

As a solution to this problem, a method has been found wherein in dependence upon the pressure of the gas in the reactor moreover by way of a second regulating section a second setting member which influences the gas return rate in a gas return path connecting the gas withdrawal path downstream of the gas compressor and the gas withdrawal path upstream of the gas compressor or with the reactor is controlled. The controlling of the second setting member takes place with less inertia than the controlling of the first setting member.

Since the controlling of the second adjusting member takes place with less inertia than the controlling of the first adjusting member, suddenly occurring pressure fluctuations in the reaction chamber are very rapidly evened out; long-term pressure rises practically no longer occur; the occurrence of a negative pressure in the reactor chamber is practically completely avoided.

The method can be carried out without difficulty in a manner in which the pressure of the gas in the reactor is kept within the very narrow tolerance limits of $-0.2$ to 3 mbar and preferably $-0.05$ to 0.2 mbar around the atmospheric pressure.

It is especially advantageous to impart to the second regulating section a P characteristic and preferably a PD characteristic.

The regulation along the lines of the solution to the problem is especially effective when the setting members are adjusted so that gas return rate is less than 50% vol. and preferably less than 25% vol. of the gas withdrawal rate.

The gas return does not have to take place directly into the reactor, but can also be effected in gas preparation apparatuses lying between the reactor and the gas compressor, such as a heat exchanger and/or dust filter and/or gas washer and/or separator.

The method offers special advantages in the operation of closed carbide furnaces, for it makes it possible to use raw materials of inferior quality. Raw materials of inferior quality have a tendency to cake in the carbide furnace, which can lead to sudden gas eruptions. A high moisture content of the raw materials can also suddenly liberate a high vapour/gas quantity. However, suddenly occurring variations of quantity, and thus variations of pressure in the gas chamber of the carbide furnace, are controllable by the method according to the invention. Moreover both the gas yield and the gas quality are substantially improved by the method according to the invention, since the sucking in of undesired external air from the environment due to negative pressure in the gas chamber of the furnace practically no longer occurs.

The various features of novelty which characterize the invention are pointed out with particularity in the claims annexed to and forming a part of the specification. For a better understand of the invention, its operating advantages and specific objects obtained by its use, reference should be had to the accompanying drawing and descriptive matter in which there is illustrated and described a preferred embodiment of the invention.

BRIEF DESCRIPTION OF THE DRAWING

The FIGURE schematically depicts an operation employing the method of the invention.

DESCRIPTION OF A PREFERRED EMBODIMENT

The method according to the invention can be carried out especially advantageously in a plant such as is represented diagrammatically in the accompanying drawing.

In the drawing a reactor A is illustrated which comprises a gas chamber 2 which receives gases produced in the reactor A. The gas chamber 2 is connected through a conduit 4 with a dust filter B. From the dust filter B a conduit 6 leads to a heat exchanger C. From the heat exchanger C a conduit 8 leads to a gas washer D and from the gas washer D a conduit 10 leads to a gas compressor E. The gas from washer D is compressed by the gas compressor E and passes by way of a conduit 12, in which a throttle valve V is situated (in this example of embodiment), for further processing. Before the throttle valve V a conduit 14 is branched off which in turn branches off to secondary conduits 16, 18, 20 to the gas washer D, to the gas chamber 2 in the reactor A and to the connecting conduit 6.

In a first return conduit 22 which connects the gas compressor E outlet with the inlet there is a regulating valve V1 which is activated by the output signal of a pressure meter P which detects the pressure in the gas chamber 2 of the reactor A, through a regulating section R1 which is only diagrammatically indicated. In the second return conduit 14 there is positioned a second regulating valve V2, which is activated by the pressure meter Pm through a second regulating section R2, likewise merely diagrammatically indicated. The regulating sections R1 and R2 co-operate with the regulating valves V1 and V2 associated with them in such a way that the regulating valve V1 is shifted substantially more inertly than the regulating valve V2, upon signals from the pressure meter P.

If a pressure $p_9$ prevails in the gas chamber 2 of the reactor A, then a somewhat smaller pressure P1 prevails in the conduit 4 (in the middle). Correspondingly in the middle in the conduit 6 a pressure P2 prevails which is less than P1, in the middle of the conduit 8 a pressure P3 prevails which is less than P2 and in the conduit 10 a pressure P4 prevails which is less than P3. In the conduit 12, on account of the gas compressor E, a pressure P5 prevails which is greater than P4, so that gas seeks to flow through the conduit 22 in the direction as indicated by the arrows. The pressure P5 in the conduit 12 lies above atmospheric pressure. The throttle valve V therefore expands P5 to Patm. In the return conduit 14 upstream of the regulating valve V2 a pressure P6 prevails which lies betwee P2 and P5. Accordingly the gas can flow through the secondary conduits 16, 18 and 20 in the direction indicated by the arrows.

Two examples are given below for the operation of the plant according to the drawing.

EXAMPLE 1

A closed carbide furnace A in normal operation produces approximately 5,000 $Nm^3$ of carbide furnace gas per hour. The gas is prepared by the dust filter B and the heat exchanger C. The conveying of the total gas quantity of about 8,000 $Nm^3$/hour takes place through the gas compressor E, and about 2,000 $Nm^3$/h. of the gas are moved in the cycle by way of the regulating valve V1. The slowly responding regulating section R1 adjust the regulating valve V1 so that slow variations of the gas pressure in the gas chamber 2, caused by variations of the output of the carbide furnace A, are balanced by corresponding variations of the quantity of gas sucked away.

In the normal case 1,000 $Nm^3$/h. of carbide furnace gas are returned through the regulating valve V2 into the carbide furnace A. A rapid pressure increase in the gas chamber 2 effects, by way of the regulating section R2, an immediate reduction of the quantity of gas returned through the regulating valve V2. Thus immediate action is taken against a rise of the pressure in the gas chamber 2. Conversely on a rapid drop of the pressure in the gas chamber 2 the quantity of gas returned by way of the regulating valve V2 is rapidly increased.

Therefore the regulating valve V1 regulates an output-caused variation of the gas pressure in the carbide furnace A, while the regulating valve V2 evens out superimposed quick pressure variations in the gas chamber 2, caused for example by the running of the furnace. The pressure in the gas chamber 2 of the carbide furnace A as a result varies constantly only by about $-0.1$ to $+0.15$ mbar from the atmospheric pressure.

EXAMPLE 2

In the hydration of calcium cyanamide in a reactor A about 1,500 $Nm^3$ per hour of a gas mixture of acetylene, ammonia, nitrogen and water vapour are produced. The gas current, which is continuous but the quantity of which fluctuates greatly, is conveyed by the gas compressor E out of the reactor A by way of a dust filter B and a gas washer D. In the gas washer D about 1,100 $Nm^3$/h. of the gas are held back or condensed.

Slow variations are regulated by way of the regulating section R1 in such a way that the regulating valve V1 follows slow variations of quantity of the gas current and conducts more or less gas in the cycle.

In the normal case 100 $Nm^3$/h. of gas are conducted by way of the regulating valve V2 from the delivery side of the gas compressor E back into the gas washer D. In the case of rapidly rising pressure or the occurrence of pressure peaks in the gas chamber, the regulating valve V2 throttles the returned gas current. Falling pressure in the gas chamber 2 of the reactor A or in the gas washer D effects an increase of this gas quantity until the pressure has reached its ideal value in the gas chamber 2. By this regulation the pressure in the gas chamber 2 is kept so that it does not vary more than $\pm 0$ to $+3$ mbar from atmospheric pressure.

It will be understood that the specification and examples are illustrative but not limitative of the present invention and that other embodiments within the spirit and scope of the invention will suggest themselves to those skilled in the art.

What is claimed is:

1. A method for regulating pressure of a gas produced in a reactor and continuously withdrawn from the reactor by means of a gas compressor in a gas withdrawal path to a substantially constant pressure value in the reactor, comprising: controlling the gas withdrawal rate through the gas withdrawal path, in dependence upon the pressure of the gas in the reactor using, a first setting member in a first gas return conduit leading from the outlet to the inlet of the gas compressor; and controlling the gas return rate in a second gas return conduit, in dependence upon the pressure of the gas in the reactor using, a second setting member in the second gas return conduit leading from the outlet of the gas compressor to the reactor or upstream of the gas compressor into a heat exchanger and/or dust filter and/or gas washer lying in the gas withdrawal path between the reactor and the gas compressor, said second setting member reacting with less inertia on pressure changes of the gas in the reactor than said first setting member.

2. The method of claim 1 wherein the first setting member is in a first regulating section.

3. The method of claim 1 wherein the second return conduit leads into a heat exchanger and/or dust filter and/or gas washer lying in the gas withdrawal path between the reactor and the gas compressor.

4. The method of claim 1 wherein the pressure of the gas in the reactor is maintained within tolerance limits of −0.2 mbar to the +3 mbar around the atmospheric pressure.

5. The method of claim 4, wherein the pressure of the gas in the reactor is maintained within tolerance limits of −0.05 mbar to +0.2 mbar around the atmospheric pressure.

6. The method of claim 2 wherein the second setting member is regulated through a second regulating section which possesses a P-characteristic.

7. The method of claim 6, wherein the second regulating section possesses a PD characteristic.

8. The method of claim 1 wherein the gas return rate is less than 50% vol. of the gas withdrawal rate.

9. The method of claim 8, wherein the gas return rate is less than 25% vol. of the gas withdrawal rate.

* * * * *